United States Patent
Ricci et al.

(10) Patent No.: US 8,965,553 B2
(45) Date of Patent: Feb. 24, 2015

(54) GROUP OF REFLECTION OPTIC SENSORS IN A WEFT FEEDER FOR WEAVING LOOMS

(75) Inventors: Paolo Ricci, Pollone Bi (IT); Luca Bagatin, Biella (IT)

(73) Assignee: RJO S.r.l., Biella (IT)

( * ) Notice: Subject to any disclaimer, the term of this patent is extended or adjusted under 35 U.S.C. 154(b) by 60 days.

(21) Appl. No.: 13/996,373

(22) PCT Filed: Dec. 21, 2011

(86) PCT No.: PCT/EP2011/073671
§ 371 (c)(1),
(2), (4) Date: Jul. 9, 2013

(87) PCT Pub. No.: WO2012/085141
PCT Pub. Date: Jun. 28, 2012

(65) Prior Publication Data
US 2013/0276934 A1    Oct. 24, 2013

(30) Foreign Application Priority Data

Dec. 23, 2010 (IT) ............... MI2010U0390

(51) Int. Cl.
*G06F 19/00* (2011.01)
*D03D 47/36* (2006.01)
*A23C 9/12* (2006.01)
(Continued)

(52) U.S. Cl.
CPC ............ *D03D 47/367* (2013.01); *A23C 9/1203* (2013.01); *A23C 19/061* (2013.01); *A23L 1/0032* (2013.01); *A23L 1/0055* (2013.01);
(Continued)

(58) Field of Classification Search
USPC ........ 700/140, 143–144; 139/452; 242/364.7, 242/364.8; 356/429–430
See application file for complete search history.

(56) References Cited

U.S. PATENT DOCUMENTS 4,687,149 A * 8/1987 Riva ........................ 242/364.8
5,377,922 A * 1/1995 Fredriksson et al. ...... 242/364.8
(Continued)

FOREIGN PATENT DOCUMENTS

WO    2008055571 A1    5/2008

OTHER PUBLICATIONS

International Search Report for PCT/EP2011/073671 Mar. 1, 2013.

*Primary Examiner* — Nathan Durham
(74) *Attorney, Agent, or Firm* — Pearne & Gordon LLP

(57) ABSTRACT

Group of optic sensors (S) in a weft feeder, in particular for weaving looms, comprising one or more pairs of emitting sensors (E) and receiving sensors (R) arranged on a portion of the weft feeder (C) which extends laterally to the drum (T) of the weft feeder whereon the coils of the weft thread are wound, so as to form optic radiation going-paths from each of said emitting sensors (E) to a reflecting surface (9) provided on said drum (T) and optic radiation back-paths, from said reflecting surface (9) to corresponding receiving sensors (R), for detecting the presence/absence of a thread which crosses said paths. The optic sensors (E, R) are of the SMT type and are wired on a printed-circuit board (8) with an optic axis parallel to the plane of said board (8). A first group of total-reflection mirrors (V), one for each pair of emitting/receiving sensors (E, R), is inclined so as to deviate the optic radiation from the plane of the board (8) to a plane perpendicular to or inclined with respect to the same. A second group of partial-reflection mirrors (H), one for each pair of emitting/receiving sensors (E, R), is inclined so as to deviate the optic radiation in the same plane as board 8.

9 Claims, 3 Drawing Sheets

(51) Int. Cl.
*A23C 19/06* (2006.01)
*A23L 1/00* (2006.01)
*A23L 1/03* (2006.01)
*A23L 1/30* (2006.01)
*D03D 51/34* (2006.01)

(52) U.S. Cl.
CPC ............ *A23L 1/0345* (2013.01); *A23L 1/3014* (2013.01); *D03D 51/34* (2013.01); *A23V 2002/00* (2013.01)
USPC .......................................... 700/140; 139/452

(56) References Cited

U.S. PATENT DOCUMENTS

| | | | |
|---|---|---|---|
| 5,590,547 A | | 1/1997 | Conzelmann |
| 5,613,528 A | * | 3/1997 | Zenoni et al. .................. 139/452 |
| 5,966,211 A | * | 10/1999 | Lilja ........................... 356/238.2 |
| 5,983,955 A | * | 11/1999 | Hellstroem .................... 139/452 |
| 6,044,871 A | * | 4/2000 | Zenoni ........................... 139/452 |
| 6,062,501 A | * | 5/2000 | Halvarsson ................... 139/452 |
| 6,123,281 A | * | 9/2000 | Eriksson ....................... 139/452 |

* cited by examiner

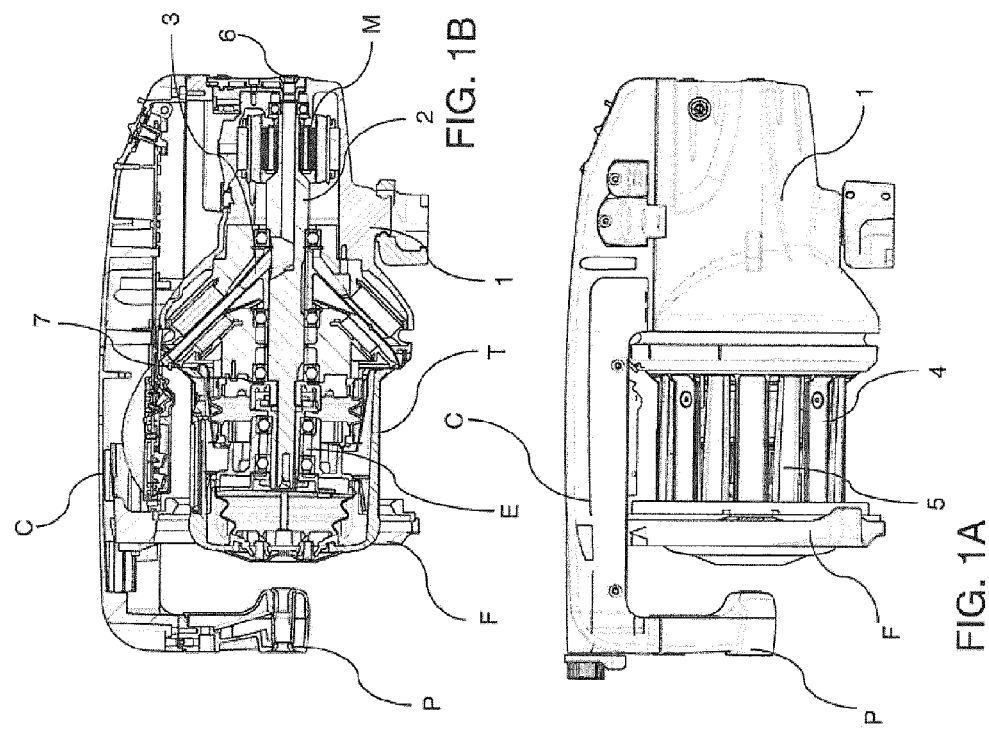
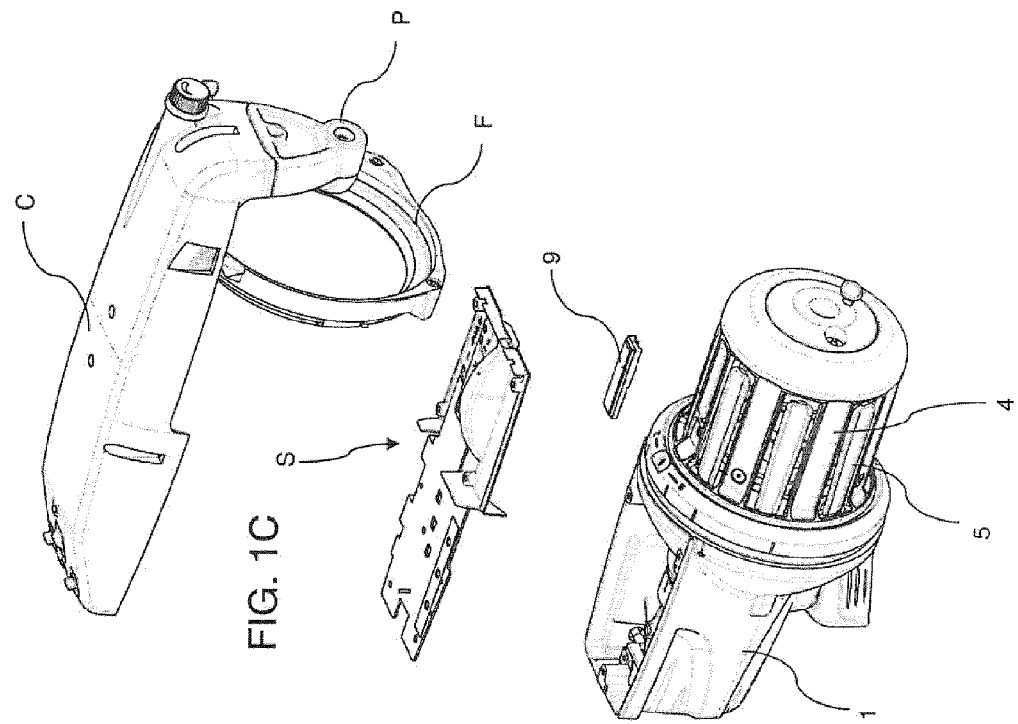

US 8,965,553 B2

GROUP OF REFLECTION OPTIC SENSORS IN A WEFT FEEDER FOR WEAVING LOOMS

FIELD OF THE INVENTION

The present invention refers to a group of reflection optic sensors in a weft feeder of weaving threads, in particular for weaving looms.

BACKGROUND OF THE PRIOR ART

Weft feeding devices for weaving looms are apparatuses which are arranged between the loom and the thread reels which feed the weft to the loom, to perform the function of unwinding the thread off the reels and hence make it available to the weft insertion devices, keeping the thread tension within acceptable levels during the entire weft insertion operation, and hence avoiding the abrupt tension peaks in the thread which occur instead upon weft insertion in looms without weft feeders. This object is achieved through the presence, in the weft feeder, of a winding assembly which regularly and at a lower average speed takes the weft thread from the reels, accumulating it in successive coils on a stationary cylindrical drum whereon it hence forms a thread stock. Such stock is then collected, discontinuously and at high speed, by the weft insertion devices (launch nozzles or grippers) of the loom.

The weft feeder is an apparatus which has been in use in weaving looms for many years now, in particular since modern high-speed looms have been introduced, wherein the direct feeding from the reels has never been technically possible. During its evolution over the years, in addition to the basic functions recalled above, the weft feeder has acquired additional control functions which allow to verify the constant presence of thread in the critical points of the weft feeder, to adjust the amount of thread accumulated in the stock, to brake the outgoing thread to limit the dynamic effects determined by the abrupt acceleration during its collection by the weft insertion devices, to measure the length of the thread portion collected by the insertion devices, and hence to stop thread collection as soon as a predetermined length thereof has been supplied.

These different functions are obtained due to the presence, aboard the weft feeder, of a processing unit which operates on the basis of sophisticated algorithms, starting from electric signals for the detection of the thread presence/absence in correspondence of the above-said critical points of the apparatus. These electric signals are currently obtained, preferably with respect to the use of mechanical sensors, through pairs of emitting/receiving optic sensors arranged on the weft feeder so that the path of the optic radiation between a emitting sensor and a receiving sensor intercepts the thread path in a desired control position. Depending on the type of path of the optic radiation, and consequently of the positioning of the optic sensors on the weft feeder, current weft feeders divide into two categories.

In a first weft feeder category, both emitting sensors and receiving sensors are arranged on a support arm which projects from the main body of the weft feeder and extends parallel to the lateral surface of the drum, and the path of the optic radiation between each pair of sensors is obtained through a respective reflecting surface fastened to the lateral surface of the drum which faces said support arm, in a carefully preset position and angle.

In a second weft feeder category, the emitting sensors are instead arranged on the outer surface of the stationary drum which faces the support arm, while the receiving sensors remain in the position already described above on said support arm.

Problem and Solution

The weft feeders of the first category, which are targeted by the present invention, up until today have enjoyed more popularity due to the greater construction simplicity thereof over the weft feeders of the second category, wherein the installation of emitting sensors on the stationary drum creates problems of non-easy solution both due to the electric supply thereof and due to the mechanic arrangement thereof. In the light of such greater construction simplicity, however, the weft feeders of the first category have nevertheless a certain complication of the optic system of the reflection sensors, which as a matter of fact requires very thorough positioning and excellent component protection from dusts to be able to work effectively despite the greater path length of the optic signals.

The object of the present invention is hence to offer a group of optic sensors for reflection weft feeders which is particularly effective in the operation thereof, simple in the mounting thereof and hence definitely economic, and substantially free from problems of the components thereof getting soiled by weaving dusts.

A further object of the present invention is to provide a particularly compact group of optic sensors, so as to have reduced bulk, especially in terms of thickness, within the weft feeder. Said weft feeder is thus overall more compact and hence easy to install as close as possible to the weft insertion means in the loom, especially when a large number of weft feeders is provided (multi-coloured fabrics).

Such objects are achieved, according to the present invention, through a group of optic sensors for reflection weft feeders having the features defined in the attached main claim. Preferred and additional features of the group of optic sensors are defined in the dependent claims.

BRIEF DESCRIPTION OF THE DRAWINGS

Further features and advantages of the group of sensors according to the present invention will in any case be more evident from the following detailed description, provided purely as a non-limiting example and illustrated in the attached drawings, wherein:

FIG. 1A is an elevation side view of a weft feeder which embodies a group of optic sensors according to the present invention;

FIG. 1B is a section view of the weft feeder of FIG. 1A;

FIG. 1C is an exploded view which illustrates the main component parts of the weft feeder of FIG. 1A;

DETAILED DESCRIPTION

Figure 2:
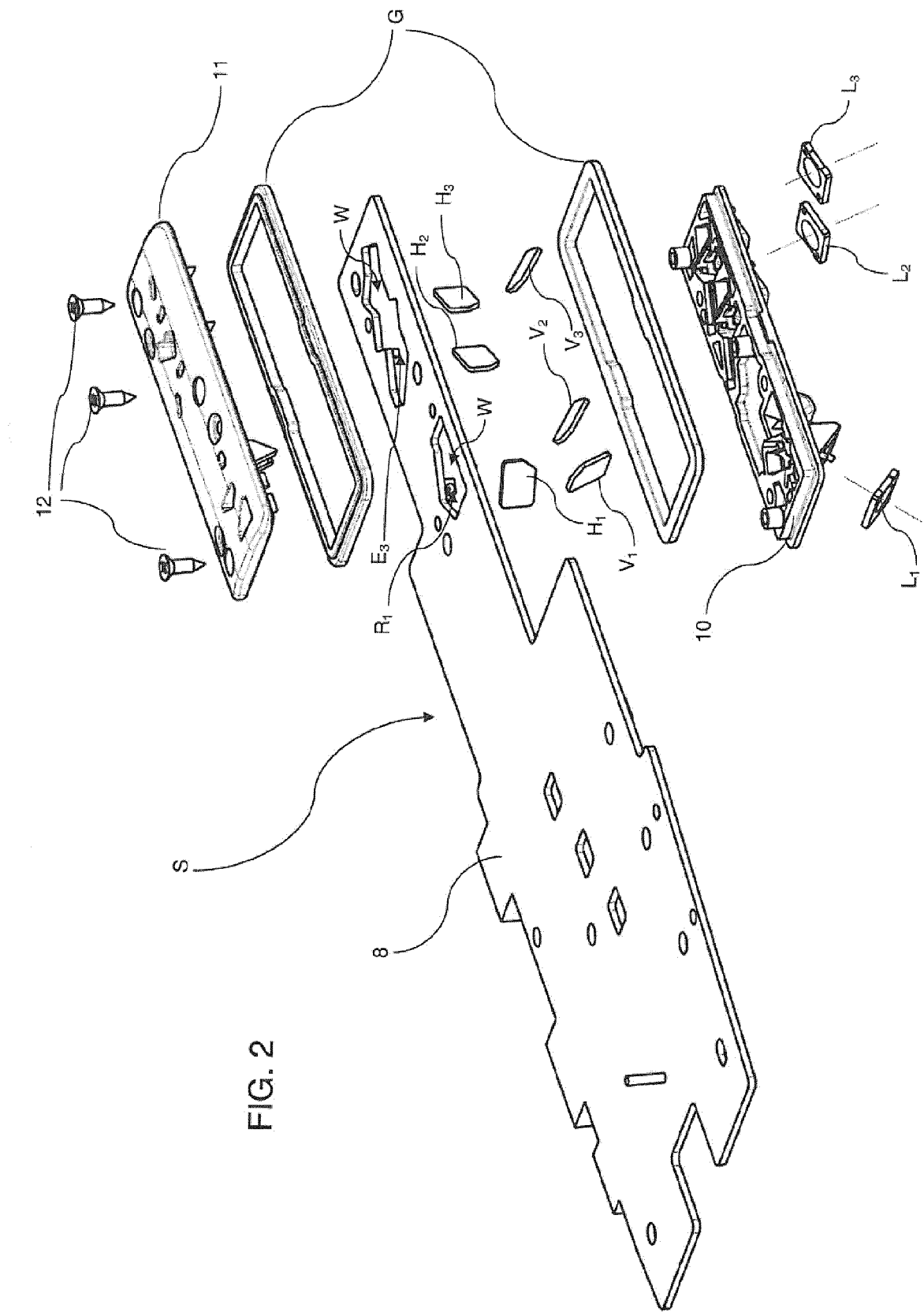
FIG. 2 is an exploded view of the group of optic sensors for weft feeders according to the present invention.

In FIGS. 1A, 1B and 1C the general per se known structure of the weft feeder according to the present invention is clearly visible. Such weft feeder consists of a main body 1 within which an electric motor M for the driving of a rotary hollow shaft 2 is housed. Rotary shaft 2 drives into rotation, with the middle portion thereof, a cup rotor 3, and with the end portion thereof an eccentric device E housed—free to rotate—within a drum T. The outer surface of drum T consists of multiple sectors 4 which have wide cut-outs through which an equal number of fingers 5 integral with said eccentric device E can pass.

The thread coming from the reel (not shown) axially enters the hollow shaft 2 of the weft feeder, from the rear end 6 thereof, and comes out of an exit opening 7 formed on the periphery of rotor 3, through a channel formed internally in the same and in connection with the axial cavity of shaft 2. When rotor 3 is driven into rotation, the thread taken from the reel is arranged in subsequent coils on the sectors 4 of drum T. The simultaneous rotation of the eccentric device, itself driven by shaft 2 into rotation within drum T, then determines a progressive displacement of the thread coils onto sectors 4, moving away from rotor 3 and at a constant and adjustable mutual distance, through the movement of the fingers 5 which cyclically come out of sectors 4 and go back in there.

On the upper part of main body 1 of the weft feeder finally a cover C is fastened, which cover extends above the lateral surface of drum T and in front of the same and within which a group of optic sensors S and the corresponding supply and control electric circuit are housed. An annular braking device F of the thread taken from drum T and a thread guide P are finally fastened to cover C, in correspondence of the front part thereof.

Figure 3:
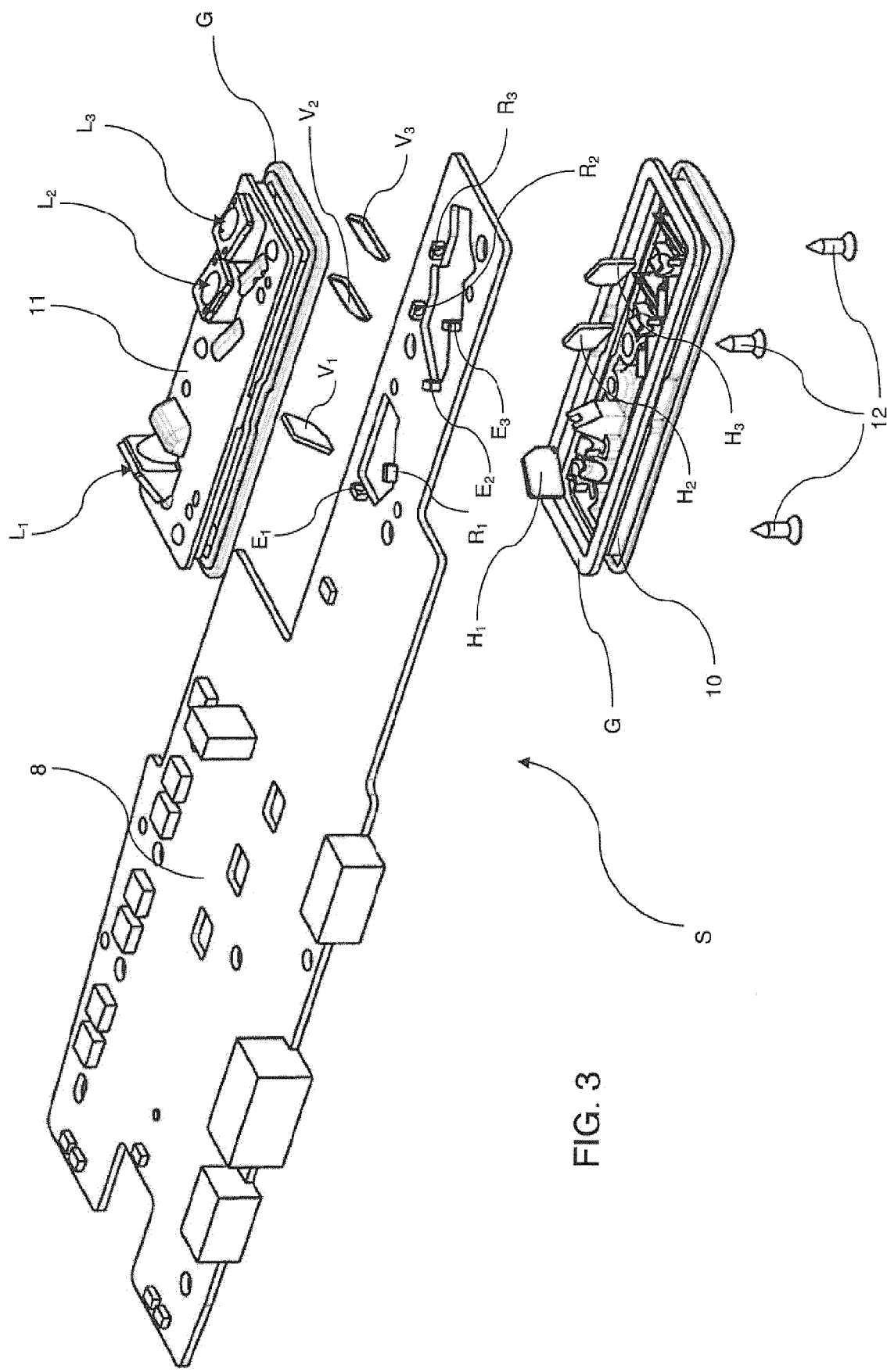
FIG. 3 is an exploded view of the same group of optic sensors of FIG. 2 in a position flipped upside down.

The structure of the group of sensors S, which the present invention specifically addresses, is illustrated in greater detail in FIGS. 2 and 3 and preferably comprises three pairs of emitting/receiving sensors E/R.

According to a main feature of the present invention, both emitting sensors E and receiving sensors R consist of SMT-type devices, i.e. extremely compact, surface-mount devices which can be welded with an automatic process to a printed-circuit board 8 together with all the other components of the supply and control circuit of said optic sensors. Moreover sensors E and R have their optic operating axis lying in the plane parallel to the plane wherein board 8 lies - which plane in a preferred solution is parallel to the axis of the weft feeder and is hence horizontal, or virtually horizontal, when the weft feeder is in its standard operating position - rather than in a vertical or inclined plane, as occurs instead in the groups of sensors known so far.

This particular choice, both of the type of optic sensors E and R and of the inclination of the corresponding optic axis allows to achieve at least two important advantages. A first advantage is the opportunity to use electronic components (emitter and receiver) which can be mounted—with a fully automated process—directly on the main circuit together with the CPU and the driver of electric motor M; as a matter of fact, automatic manufacturing processes, in addition to being undeniably cheaper, also guarantee consistent results in the positioning of components and hence extremely high quality standards with the further advantage of a dramatic reduction of wastes and of any subsequent burdensome repair activities. As a matter of fact, in this case it is possible to adjust much more thoroughly the inclination of the optic axis of sensors E and R during their automatic mounting on board 8, due to the fact that such inclination depends on the angle which the device takes up with respect to the same plane of the board 8 whereon the welding thereof takes place.

A second important advantage is to remarkably reduce the device thickness with respect to that of conventional devices employing sensors of the THT type (through-hole technology) with vertical optic axis or an axis variously inclined with respect to the plane of board 8.

As clearly visible in FIG. 3, emitting sensors E, consisting of SMT LEDs, comprise a sensor $E_1$ meant to detect the coils of incoming thread on drum T and hence to monitor any thread breakage, a sensor $E_2$ arranged to detect the condition of complete filling of the thread stock on drum T and finally a sensor $E_3$ which allows to count outgoing coils from the drum. Similarly, receiving sensors R, consisting of SMT phototransistors, in turn comprise sensors $R_1$, $R_2$ and $R_3$, each one corresponding to the same-index emitting sensors described above. All sensors E and R are fastened along respective edges of cut-outs W formed in the board 8, so as to avoid undue reflections of the optic radiation by the surface of board 8.

As already stated above, the optic axis of all sensors E and R is substantially parallel to the plane wherein board 8 lies. Therefore, in order to be able to allow the optic radiation emitted by each one of the emitting sensors E the desired going-path as far as drum T—or, more precisely, as far as a reflecting layer 9 (FIG. 1C) formed on a sector 4 of the drum T facing the group of sensors S—and hence the back-path as far as the corresponding receiving sensor R, in the present invention a particular mirror reflection system has been provided which will be illustrated in the following.

One of the objects which the present invention aims to solve is to provide a thin, highly compact group of sensors which is substantially free from soiling problems. In order to achieve such object, the mirror reflection system of the present invention consists of two separate groups of mirrors and precisely a first group of total-reflection mirrors V, inclined in such a way as to deviate the optic radiation from the plane of board 8 to a plane perpendicular to o inclined with respect to the same, and a second group of partial-reflection mirrors H, i.e. semi-reflecting and hence partly transparent, inclined so as to deviate a portion of the optic radiation—while the remaining portion crosses the mirrors without undergoing deviation—keeping it in a plane parallel to the plane of board 8.

In particular, semi-reflecting mirrors $H_1$, $H_2$ and $H_3$ are respectively arranged, with a suitable angle, in the point of intersection between the optic axis of emitting sensors $E_1$, $E_2$ and $E_3$ and that of receiving sensors $R_1$, $R_2$ and $R_3$. Along the going-path of the output optic radiation from emitting sensors E, a portion of the same hence crosses without deviations such mirrors H and reaches mirrors V by which it is fully deviated in a direction inclined to or perpendicular with respect to board 8, crossing focussing lenses L, which concentrate the radiation towards the reflecting surface 9 located on drum T, which surface consists for example of a cat's eye or of a mirror. Along the back-path thereof, the radiation follows an identical path, through lens L and total-reflection mirrors V, until it reaches semi-reflecting mirrors H where a portion of such radiation is deviated to receiving sensors R. The portions of optic radiation which, respectively, are reflected by mirrors H in the going-path and are not deviated by the same mirrors H in the back-path, disperse without creating interferences within the group of sensors.

The particular mirror reflection system described above allows to use SMT components mounted on a standard horizontal plane (i.e. that of board 8) and with the optic axis parallel to the plane of said board, making the group of optic sensors highly compact in the vertical direction (or, more precisely, in a plane perpendicular to the plane of the printed-circuit board 8). As a matter of fact, according to the present invention, mirrors V and H are simply inserted and fastened into suitable seats, having a preset location and inclination, moulded within a housing shell of the same. In the preferred solution illustrated here, the shell is in the shape of two coupled half-shells and precisely one upper half-shell 10, wherein the seats for mirrors H are formed, and one lower half-shell 11, wherein the seats for mirrors V are formed.

Once the mounting has occurred, mirrors H and V project from the two opposite half-shells 10 and 11 toward board 8 where they arrange themselves within the cut-outs W formed in the board 8, along the edges of which cut-outs W the sensors E and R have been fastened, as illustrated in FIG. 3.

The two half-shells 10 and 11 are formed so as to be able to mutually couple sandwich-like on board 8 and on opposite sides of the same, hence enclosing the end part of board 8 which carries sensors E and R. The two half-shells 10 and 11 are then mutually blocked by screws 12, after arranging in between dust-proof gaskets G between each half-shell and the respective surface of board 8. The group of sensors S thus takes up the shape of a particularly compact block, displaying extremely low thickness and the inside of which is fully dustproof and oilproof, thereby avoiding the aging thereof. Finally, lenses L1, L2 and L3, which are necessary for focussing the outgoing optic radiation from mirrors V on the reflecting surface 9 of drum T, are also mounted on respective supports, having a preset location and inclination, formed by moulding in the outer wall of the lower half-shell 11.

From the preceding description it is clear how the group of optic sensors of the present invention has fully achieved its aimed objects. Firstly, the use of SMT optic sensors with horizontal optic axis, combined with the particular mirror reflection system described above, allows to reduce the thickness of the group of sensors S to particularly low values with respect to the similar devices previously known. Secondly, having preformed all the seats for the different components of the optic group—sensors E and R, mirrors V and H and lenses L—by injection moulding in board 8 (sensors E and R), in the upper half-shell 10 (mirrors H) and in the lower half-shell 11 (mirrors V and lenses L), the mounting of the above-said different elements can be easily accomplished automatically and with a high degree of precision and repeatability. Finally, the arrangement of the group of sensors within a shell closed sandwich-like on board 8 guarantees the maximum sealing of the group from dusts and oils, thus guaranteeing consistent and continued reliability of the sensor assembly over time.

However, it is understood that the invention must not be considered limited to the particular arrangement illustrated above, which represents only a preferred embodiment thereof, but that different variants are possible, all within the reach of a person skilled in the field, without departing from the scope of the invention, which is hence defined solely by the following claims.

The invention claimed is:

1. Group of optic sensors (S) in a weft feeder, in particular for weaving looms, of the type wherein one or more pairs of emitting sensors (E) and receiving sensors (R) are arranged on a portion of the weft feeder (C) which extends laterally to the drum (T) of the weft feeder whereon the coils of the weft thread are wound, so as to form optic radiation going-paths, from each one of said emitting sensors (E) to a reflecting surface (9) provided on said drum (T) and optic radiation back-paths, from said reflecting surface (9) to the corresponding receiving sensors (R), for detecting the presence/absence of a thread which crosses said paths, characterised in that it comprises: SMT-type optic sensors (E, R) welded on a printed-circuit board (8) and having the optic axis parallel to the plane of said board (8); a first group of total-reflection mirrors (V), one for each pair of emitting/receiving sensors (E, R), inclined so the as to deviate an optic radiation parallel to the plane of the board (8) in a plane perpendicular to or inclined with respect to the same; and a second group of partial-reflection mirrors (H), one for each pair of emitting/receiving sensors (E, R), inclined so as to partly deviate an optic radiation, keeping it in a plane parallel to the plane wherein the board (8) lies.

2. Group of optic sensors (S) as claimed in claim 1, wherein each one of the mirrors of the first (V) and of the second (H) group of mirrors is arranged so as to be crossed by the optic axis of a corresponding emitting sensor (E).

3. Group of optic sensors (S) as claimed in claim 2, wherein each one of the mirrors of the second partial-reflection group (H) is arranged so as to be crossed also by the optic axis of a corresponding receiving sensor (R).

4. Group of optic sensors (S) as claimed in claim 3, wherein each mirror of the second partial-reflection group is arranged in between a corresponding emitting sensor (E) and a corresponding mirror of the first total-reflection group (V).

5. Group of optic sensors (S) as claimed in claim 3, wherein said mirrors (V, H) of the first and second group of mirrors are housed in respective seats, having a preset location and inclination, formed in a lower half-shell (11) and in an upper half-shell (10), respectively.

6. Group of optic sensors (S) as claimed in claim 4, wherein said half-shells (10, 11) are mutually coupled sandwich-like on said board (8) through screw means (12), by arranging in between dustproof gaskets (G).

7. Group of optic sensors (S) in a weft feeder as claimed in claim 4, furthermore comprising lenses (L) focussing the optic radiation coming from each of said mirrors (V) of the first group of mirrors, said lenses (L) being fastened in respective seats, having a preset location and inclination, formed on the outer surface of said lower half-shell (11).

8. Group of optic sensors (S) as claimed in claim 1, wherein said emitting sensors (E) and said receiving sensors (R) are fastened along respective edges of cut-outs (W) formed in the printed-circuit board (8).

9. Group of optic sensors (S) as claimed in claim 1, wherein said printed-circuit board (8) lies in a plane parallel to the axis of the weft feeder.

* * * * *

UNITED STATES PATENT AND TRADEMARK OFFICE
CERTIFICATE OF CORRECTION

| | | |
|---|---|---|
| PATENT NO. | : 8,965,553 B2 | Page 1 of 1 |
| APPLICATION NO. | : 13/996373 | |
| DATED | : February 24, 2015 | |
| INVENTOR(S) | : Paolo Ricci et al. | |

It is certified that error appears in the above-identified patent and that said Letters Patent is hereby corrected as shown below:

On the title page item (73) Assignee, "RJO S.r.l.", should be -- ROJ S.r.l. --

Signed and Sealed this
Twenty-first Day of July, 2015

Michelle K. Lee
*Director of the United States Patent and Trademark Office*